(12) United States Patent
Hong et al.

(10) Patent No.: US 6,819,796 B2
(45) Date of Patent: Nov. 16, 2004

(54) METHOD OF AND APPARATUS FOR SEGMENTING A PIXELLATED IMAGE

(75) Inventors: Qi He Hong, Abingdon (GB); Nicolas Steven Holliman, Wallingford (GB)

(73) Assignee: Sharp Kabushiki Kaisha, Osaka (JP)

( * ) Notice: Subject to any disclaimer, the term of this patent is extended or adjusted under 35 U.S.C. 154(b) by 583 days.

(21) Appl. No.: 09/748,751

(22) Filed: Dec. 26, 2000

(65) Prior Publication Data

US 2002/0037103 A1 Mar. 28, 2002

(30) Foreign Application Priority Data

Jan. 6, 2000 (GB) .............................................. 0000155

(51) Int. Cl.[7] .............................................. G06K 9/34
(52) U.S. Cl. ........................ 382/173; 382/166; 358/464
(58) Field of Search .......................... 382/166, 173–178; 358/462–466

(56) References Cited

U.S. PATENT DOCUMENTS

| | | | | |
|---|---|---|---|---|
| 5,177,608 A | * | 1/1993 | Ohki et al. .............. | 348/416.1 |
| 5,734,747 A | * | 3/1998 | Vaidyanathan .............. | 382/170 |
| 5,781,198 A | * | 7/1998 | Korn .......................... | 345/634 |
| 5,812,787 A | * | 9/1998 | Astle .......................... | 709/247 |
| 5,903,660 A | | 5/1999 | Huang et al. | |
| 5,903,664 A | | 5/1999 | Hartley et al. | |
| 5,912,994 A | | 6/1999 | Norton et al. | |
| 5,915,044 A | | 6/1999 | Gardos et al. .............. | 382/236 |
| 5,933,524 A | | 8/1999 | Schuster et al. ............ | 382/168 |
| 6,061,476 A | * | 5/2000 | Nichani ....................... | 382/270 |
| 6,249,613 B1 | * | 6/2001 | Crinon et al. ............... | 382/236 |
| 6,259,827 B1 | * | 7/2001 | Nichani ....................... | 382/291 |
| 6,335,985 B1 | * | 1/2002 | Sambonsugi et al. ...... | 382/190 |
| 6,396,949 B1 | * | 5/2002 | Nichani ....................... | 382/173 |
| 6,434,254 B1 | * | 8/2002 | Wixson ....................... | 382/103 |
| 6,731,800 B1 | * | 5/2004 | Barthel et al. .............. | 382/176 |

OTHER PUBLICATIONS

European Search Report regarding Application No. 01300037.7 dated Oct. 17, 2003.

Search Report, Application No. GB 0000155.2, dated Oct. 2, 2000.

* cited by examiner

Primary Examiner—Jingge Wu
(74) Attorney, Agent, or Firm—Renner, Otto, Boisselle & Sklar, LLP

(57) ABSTRACT

This invention relates to a method for segmenting a pixellated image, comprising: (a) selecting at least one first region from a first reference image; (b) deriving from values of pixels of the at least one first region a first threshold such that a first predetermined proportion of the pixels have values on a first side of the first threshold; (c) forming a difference image as a difference between each pixel of the image and a corresponding pixel of an image of a non-occluded background; and (d) allocating each difference image pixel to at least one first type of region if the value of the difference image pixel is on the first side of the first threshold and the values of more than a first predetermined number of neighboring difference image pixels are on the first side of the first threshold. An apparatus for performing the foregoing method is disclosed.

58 Claims, 8 Drawing Sheets

4- Connected neighbourhood
22

8-Connected neighbourhood
23

METHOD OF AND APPARATUS FOR SEGMENTING A PIXELLATED IMAGE

BACKGROUND OF THE INVENTION

1. Field of the Invention

The present invention relates to a method of and an apparatus for segmenting a pixellated image into at least one foreground region and at least one background region. Such techniques may be used in the field of video compression in order to reduce the data rate and/or improve compression quality of foreground regions. Such techniques may also be used to compose new image sequences by replacing a segmented background with another background image or another sequence of background scenes. Further possible applications include video communication, video conferencing, television broadcasting, Internet multimedia applications, MPEG-4 applications, face detection applications and real time video tracking systems such as observer tracking autostereoscopic 3D displays. A specific application of such techniques is in digital video cameras and other digital image capture and recording devices for multimedia applications. An example of such a device is the Sharps® Internet ViewCam.

2. Description of the Related Art

Many known image processing and analysis applications involve image sequences which contain foreground objects, which are normally temporally active, and a background region, which is relatively static. Parts of the background scene may be covered and/or uncovered as the foreground objects move and/or change shape. It is very useful for these applications to have the capability to segment the images into foreground and background regions.

The Sharp® Corporation Internet ViewCam VN-EZ1 is an MPEG-4 digital recorder made for multimedia applications. This recorder enables computer users to incorporate moving pictures into their multimedia applications, such as home pages, Internet broadcasts, and e-mail communications. This recorder uses the MPEG-4 digital moving picture compression standard and Microsoft® Advanced Streaming Format to produce moving picture files that are small in size and thus more practical for Internet distribution. The video data are recorded onto SmartMedia™ memory cards, offering approximately one hour of recording time.

A successful segmentation, for example, would enable different compression techniques to be applied to the foreground and background regions. A higher compression ratio may then be achieved, enabling a longer recording time with an improved quality in the foreground regions. In addition, the background regions may be replaced with other scenes to produce a special effect to enhance attractiveness to consumers.

Earlier systems performed segmentation by using a carefully controlled background such as a uniformly coloured screen or a brightly illuminated backing behind the foreground objects. For example, U.S. Pat. No. 5,808,682 discloses a data compressing system which segments the foreground objects from a special background, which is illuminated uniformly by a known colour. Any colour may be used but blue has been the most popular. Therefore this type of coloured backing is often referred to as blue backing. The foreground objects can then be segmented using well known chroma key technology.

On large coloured backing, it is not a simple matter to achieve uniform illumination. U.S. Pat. No. 5,424,781 discloses a linear image compositing system which corrects for non-uniform luminance and/or colour of the coloured backing without incurring the penalties of edge glow, edge darkening, loss of edge detail and other anomalies.

For black-and-white images, it is known to use a controlled background so as to try to separate the foreground objects and the background scene into two different ranges of the grey scale. Typically the segmentation may be achieved by finding a deep valley in the histogram of the grey levels Nobuyuki Otsu "A threshold selection method from grey-level histograms", IEEE Trans. on Systems, Man and Cybernetics, Vol. SME-9, No. 1, January 1979 pp. 62–66 discloses such a method to find an optimal threshold to segment the foreground objects from their background. FIG. 1 of the accompanying drawings illustrates a histogram of this type in which h(t) represents the number of pixels and t represents the amplitude of the pixel values. The controlled background is such that the majority of the background pixels have relatively low levels whereas the foreground pixels have levels which tend to occupy a higher range. Otsu attempts to define a threshold T in the valley between the two ranges.

There are several problems with this technique, For example, although FIG. 1 Indicates that a well-defined valley exists between the background and foreground grey level ranges, this is only the case for very carefully controlled backgrounds and possibly some but certainly not all foregrounds.

If this technique is not restricted to very carefully controlled conditions, then the problems become more severe. In particular, for many if not all images to be segmented, significant numbers of foreground pixels will have levels extending below the threshold whereas significant numbers of background pixels will have levels extending above the threshold. Thus, any threshold T which is chosen will lead to incorrect segmentation.

Another technique for segmenting an image is disclosed in T Fugimoto et al "A method for removing background regions from moving images", SPIE vol. 1606 Visual communications and image processing 1991, imaging processing, pp. 599–606. This technique makes use of both the level and polarity of the pixel values in order to be resistant to lighting intensity fluctuations.

FIG. 2 of the accompanying drawings is a histogram with the same axes as FIG. 1 but illustrating the effect of lighting intensity fluctuations. In the absence of such fluctuations, the distribution illustrated in the histogram has a narrow peak centred on the vertical axis with symmetrically sloping sides. When a lighting intensity fluctuation occurs, this peak becomes offset horizontally. The technique of Fugimoto et al is to derive asymmetrical positive and negative thresholds T1 and T2 by matching a Gaussian distribution to the actual position of the peak and simulating the remainder of the curve, which is assumed to represent foreground pixel levels, with a constant function. The intersection between the gaussian distribution and the constant function gives the threshold values T1 and T2 for the image being processed. It is then assumed that all pixel values between the thresholds represent noise.

This technique suffers from the same problems as Otsu. Although it may be resistant to lighting intensity fluctuations, the selection of the thresholds cannot be made in such a way that every image which is likely to be encountered will be correctly segmented.

U.S. Pat. No. 5,878,163 discloses an imaging target tracker and a method of determining thresholds that are used to optimally distinguish a target from its background. The target is assumed to occupy a gray level region which is identified from two histograms corresponding to the inner and outer regions of the target, respectively. Both histograms are recursively smoothed and a lookup table of actually observed pixel values is then computed. Two optimal thresholds are selected and are set at respective ends of histogram segments. The likelihood maps adapt over time to the signature of the target. The grey-level distribution of the target is used to select thresholds that pass a band of grey levels whose likelihood of their belonging to the target is high. It is not necessary for an accurate segmentation for this type of application.

While these methods may achieve reasonable results of segmentation for the desired applications and are usually computationally efficient, the requirement of having a carefully controlled background that can be distinguished from the target in either intensity or colour severely limits the range of the applications available.

A more challenging task is therefore how to segment the foreground objects from the background of a general scene. These methods often require the calculation of a difference image which characterises the difference between the current frame and a predetermined frame. The predetermined frame could be either a pre-recorded image of the background, or the previous frame, or an image generated from a number of the previous frames. U.S. Pat. No. 5,914,748 discloses an electronic compositing system for inserting a subject into a different background. The method subtracts from each image of the sequence a pre-recorded image of the background to generate a difference image. A mask image is then generated by thresholding this difference image. The mask image is used to segment the foreground objects from their background. The method is simple to implement but may require manual correction by users to remove large artefacts in both the segmented foreground regions and the background regions.

In terms of computer implementation, the segmentation of the foreground and background regions may be performed at either a pixel-based level or a block-wise level. Block-wise segmentation divides an image into blocks, each comprising a number of pixels which are all classified as either foreground or background pixels. Pixel-based and block-wise methods have their own advantages and disadvantages. For example, pixel-based segmentation can follow the boundaries of foreground objects more closely but may not have good connectivity and is more prone to noise. On the other hand, block-wise methods have fewer artefacts in the segmented foreground and background regions, but may have a poorer performance around the boundaries. Sometimes it is possible to combine these two approaches, with different combinations yielding different results depending on applications.

In data compression systems, block-wise coding methods such as the discrete cosine transform and its variants normally operate on square blocks of data, making a segmentation of the image into temporally active/inactive regions composed of square sub-segments desirable. Sauer and Jones "Bayesian block-wise segmentation of interframe differences in video sequences", CVGIP: Graphics and Image Processing, Vol. 55, No. 2, March 1993, pp. 129–139 disclose a Bayesian algorithm for segmenting images of a video sequence into blocks chosen as static background and dynamic foreground for the sake of differential coding of temporally dynamic and static regions. In this application, regions that are temporally active are defined as "foreground" and otherwise as "background", so that parts of or the whole of a foreground object may become background regions where there are no changes over these regions. This method models the data as random fields at two levels of resolution. The interframe difference at each pixel is first thresholded, yielding a binary image. The natural spatial correlation of image data is captured by a Markov random field model on this field of binary-valued pixels in the form of the classical Ising model. At the second level of resolution, the field consisting of blocks which exhibit correlation among neighbours is also described by a Markov model.

U.S. Pat. No. 5,915,044 discloses a video-encoding system that corrects for the gain associated with video cameras that perform automatic gain control. The gain-corrected images are analysed to identify blocks that correspond to foreground objects and those that correspond to the background scene. This foreground/background segmentation may be used to determine how to encode the image and may also be used during the gain-control correction of the subsequent video images. The segmentation analysis is carried out both at pixel-level and at block-level. At the pixel level, pixel differences between the current frame and a reference frame are thresholded to yield a pixel mask indicating changed pixels. The reference frame is then generated from the averaged values of a number of the previous frames. The block-level takes the pixel-level results and classifies blocks of pixels as foreground or background, which is natural for a block-based compression scheme. The basis for classification is the assumption that significantly changed pixels should occur only in the foreground objects. A threshold is generated by considering a maximum likelihood estimate of changed regions, based on zero-mean Gaussian-distributed random variable modelling. A morphological filter is applied to decrease false foreground detection before block level processing is applied to classify each block as belonging to the foreground or the background. This application does not require very accurate detection of the foreground objects. The main purpose is to separate temporally changing regions from static regions so that they can be encoded differently.

In general, these methods tend to be computationally expensive and may not be suitable for real-time applications such as the Sharp® Corporation Internet ViewCam, which has limited computing power and memory storage. The robustness of these methods may be limited, often requiring manual user correction, Whereas pixel-based methods tend to leave artefacts in both the segmented foreground and background, block-wise methods tend to produce ragged boundaries.

SUMMARY OF THE INVENTION

According to a first aspect of the invention, there is provided a method of segmenting a pixellated image, comprising the steps of:

(a) selecting at least one first region from a first reference image;
(b) deriving from values of pixels of the at least one first region a first threshold such that a first predetermined portion of the pixels have values on a first side of the first threshold;
(c) forming a difference image as a difference between each pixel of the image and a corresponding pixel of an Image of a non-occluded background; and
(d) allocating each difference image pixel to at least one first type of region if the value of the difference image pixel is on the first side of the first threshold and the values of more than a first predetermined number of neighbouring difference image pixels are on the first side of the first threshold.

The first predetermined proportion may be between 0.5 and 1. The first predetermined proportion may be substantially equal to 0.75.

The first predetermined number may be substantially equal to half the number of neighbouring difference image pixels.

Each of the at least one first region and the at least one first type of region may comprise at least one background region and the first side of the first threshold may be below the first threshold. The first reference image may comprise the difference between two images of the non-occluded background and the at least one first region may comprise substantially the whole of the first reference image.

The at least one first region may be automatically selected. The at least one first region may comprise at least one side portion of the first reference image, The at least on first region may be manually selected.

The neighbouring pixels in the step (d) may be disposed in an array with the difference image pixel location substantially at the centre of the array.

The method may comprise repeating the steps (a) to (d) for a sequence of images having a common background. The first reference image may be the preceding difference image. The at least one first region may comprise the at least one first type of region of the preceding step (d). Each step (d) may comprise forming a first initial histogram of values of the difference image pixels allocated to the at least one first type of region and the step (b) may derive the first threshold from a first resulting histogram which comprises the sum of the first initial histogram formed in the preceding step (d) and a first predetermined fraction less than 1 of the first resulting histogram of the preceding step (b). The first predetermined fraction may be a half.

The method may comprise the steps of:

(e) selecting at least one second region from a second reference image;

(f) deriving from the values of pixels of the at least one second region a second threshold such that a second predetermined proportion of the pixels have values on a second side opposite the first side of the second threshold; and (g) allocating each difference image pixel, which is not allocated to the at least one first type of region, to at least one second type of region if the value of the difference image pixel is on the second side of the second threshold and the values of more than a second predetermined number of neighbouring difference image pixels are on the second side of the second threshold.

The second predetermined proportion may be between 0.5 and 1. The second predetermined proportion may be substantially equal to 0.75.

The second predetermined number may be substantially equal to half the number of neighbouring difference image pixels.

The at least one second region may be automatically selected. The at least one second region may comprise a middle portion of the second reference image. The at least one second region may be manually selected.

The second reference image may comprise the first reference image.

The neighbouring pixels in the step (g) may be disposed in an array with the difference image pixel location substantially at the centre of the array.

The method may comprise repeating the steps (e) to (g) for a sequence of images having a common background. The second reference image may be the preceding difference image. The at least one second region may comprise the at least one second type of region of the preceding step (g). Each step (g) may comprise forming a second initial histogram of values of the difference image pixels allocated to the at least one second type of region and the step (f) may derive the second threshold from a second resulting histogram which comprises the sum of the second initial histogram formed in the preceding step (g) and a second predetermined fraction less than 1 of the second resulting histogram of the preceding step (f) The second predetermined fraction may be a half.

The method may comprise allocating each difference image pixel, which is not allocated to the at least one first type of region and which is not allocated to the at least one second type of region, as a candidate first type of pixel if a value of the difference image pixel is less than a third threshold.

The third threshold may be between the first and second thresholds. The third threshold may be the arithmetic mean of the first and second thresholds.

The method may comprise allocating each difference image pixel, which is not allocated to the at least one first type of region and which is not allocated to the at least one second type of region, to the at least one first type of region if more than a third predetermined number of the neighbouring pixels are allocated to the at least one first type of region or as candidate first type of pixels.

The neighbouring pixels may comprise an array of pixels with the difference image pixel location substantially at the centre of the array.

The third predetermined number may be half the number of neighbouring difference image pixels.

The method may comprise allocating each difference image pixel, which is not allocated to the at least one first type of region and which is not allocated to the at least one second type of region, to the at least one second type of region.

The or each image and the background image may be grey level images and the step (c) may form the difference between each image pixel and the corresponding background pixel as the difference between the grey level of each image pixel and the grey level of the corresponding background pixel.

The step (c) may comprise performing a moving window averaging step may on the or each difference image.

The image to be segmented may be a colour component image and the moving window averaging step may be performed on each of the colour components.

The or each image and the background image may be colour images and the step (c) may form the difference between each image pixel and the corresponding background pixel as a colour distance between the colour of each image pixel and the colour of the corresponding background pixel. The colour distance may be formed as:

$$\sum_{i=1}^{n} a_i |I_i - B_i|$$

where n is the number of colour components of each pixel, $I_i$ is the ith colour component of an image pixel, $B_i$ is the ith colour component of a background pixel and $\alpha_i$ is a weighting factor. Each $\alpha_i$ may be equal to 1. n may be equal to 3, $I_1$ and $B_1$ may be red colour components, $I_2$ and $B_2$ may be green colour components and $I_3$ and $B_3$ may be blue colour components.

The step (c) may form colour component difference images $I_1-B_1$ and may perform a moving window averaging step on each of the colour component difference images.

The window may have a size of 3×3 pixels.

The method may comprise forming a binary mask whose elements correspond to difference image pixels, each element having a first value if the corresponding difference image pixel is allocated to the at least one first type of region and a second value different from the first value if the corresponding difference image pixel is allocated to the at least one second type of region.

The method may comprise replacing the value of each pixel of the or each image corresponding to a difference image pixel allocated to the at least one background region with the value of the corresponding background image pixel.

The method may comprise replacing the value of each pixel of the or each image corresponding to a difference image pixel allocated to the at least one background region with the value of a corresponding pixel of a different background.

The method may comprise replacing the value of each pixel of the or each image corresponding to a difference image pixel allocated to a boundary of at least one foreground region with a linear combination of the value of the image pixel and the value of the corresponding different background pixel. The linear combination may comprise the arithmetic mean of the or each pair of corresponding pixel component values.

The method may comprise, for each colour component, forming a distribution of the differences between the colour component values of the pixels allocated to the at least one background region and the corresponding pixels of the non-occluded background image, determining a shift in the location of a peak in the distribution from a predetermined location, and correcting the colour component values of the pixels allocated to the at least one background region in accordance with the shift.

According to a second aspect of the invention, there is provided an apparatus for segmenting a pixellated image, comprising means for selecting at least one first region from a first reference image, means for deriving from values of pixels of the at least one first region a first threshold such that a predetermined proportion of the pixels have values on a first side of the first threshold, means for forming a difference image as a difference between each pixel of the image and a corresponding pixel of an image of a non-occluded background, and means for allocating each difference image pixel to the at least one first type of region if the value of the difference image pixel is on the first side of the first threshold and the values of more than a first predetermined number of neighbouring difference image pixels are on the first side of the first threshold.

According to a third aspect of the invention, there is provided an apparatus for segmenting a pixellated image, comprising a programmable data processor and a storage medium containing a program for controlling the data processor to perform a method according to the first aspect of the invention.

According to a fourth aspect of the invention, there is provided a storage medium containing a program for controlling a data processor to perform a method according to the first aspect of the invention.

According to a fifth aspect of the invention, there is provided a program for controlling a data processor to perform a method according to the first aspect of the invention.

According to a sixth aspect of the invention, there is provided an image capture device including an apparatus according to the second or third aspect of the invention.

It is thus possible to provide a robust technique for segmenting foreground and background regions of an image or a sequence of images. This may be partially achieved by combining the advantages of pixel-based and block-wise methods to produce good boundaries around the segmented foreground region or regions and few artefacts in both the foreground and background regions.

The robustness is also achieved by the use of a step-by-step approach which first identifies pixels that may be classified more reliably and easily than others. As more pixels are allocated, a better determination of the remaining pixels may be achieved.

By selecting the regions which are used for determining the thresholds, the or each threshold can be determined more accurately so as to improve the segmentation. For example, where the first threshold is used to determine background pixels, the threshold itself can be determined largely or wholly from background regions and so is not affected at all or substantially by the values of pixels in foreground regions. The second threshold when used may likewise be determined on the basis of pixel values in foreground regions so that improved segmentation of an image may be achieved. Each image may be processed recursively so that the improved segmentation leads to improved threshold selection and the improved threshold selection leads to improved segmentation. Such a recursive approach is possible in real time if sufficient computing power is available. Otherwise, such a recursive approach is limited to off-line or non-real time applications.

When processing sequences of images, the or each threshold may be determined by contributions from several or all preceding images so as to improve the threshold selection and hence the image segmentation. For example, when forming histograms for determining the or each threshold, each histogram may comprise the present histogram and a fraction, such as half, of the previous histogram so that the influence of each recursion is reduced with time but the effect on threshold selection is not excessively dominated by an unsatisfactory image, for example having a relatively small background or foreground region which might otherwise distort the threshold selection. Thus, the robustness may be self-improved as the segmentation results improve the estimation of the statistical property of the noise in the background and the signal strength of the foreground. The improved estimation in turn improves the segmentation of the next image, thus forming a loop of continuous improvement. A controlled background is not required and it is possible to deal with any background of a general scene which may include gradual changes with respect to the dynamic changes of foreground objects.

The determination of the thresholds may be related directly to the filtering process after each thresholding operation. No complicated statistical models are required so that the technique is easy to implement.

This technique can be implemented in a computationally efficient way in terms of computing power and memory requirement and involves only simple arithmetic operations, which may be implemented exclusively using integers. This makes it very suitable for real-time applications, such as in the Sharp® Corporation MPEG-4 Internet ViewCam, which has limited computing power and relatively small memory storage, or in other image capture and recording devices for multimedia applications.

This technique may be used in video tracking and face detection applications, for example as disclosed in EP0877274, GB2324428, EP0932114 and GB233590. For example, segmented foreground regions may be used to limit the searching area for locating faces in an image. This may be used in connection with a real time video tracking system, for example as disclosed in European Patent Application No. 99306962.4 and British Patent Application No. 9819323.8.

BRIEF DESCRIPTION OF THE DRAWINGS

The invention will be further described, by way of example, with reference to the accompanying drawings, in which.

DESCRIPTION OF THE PREFERRED EMBODIMENTS

Figure 1:
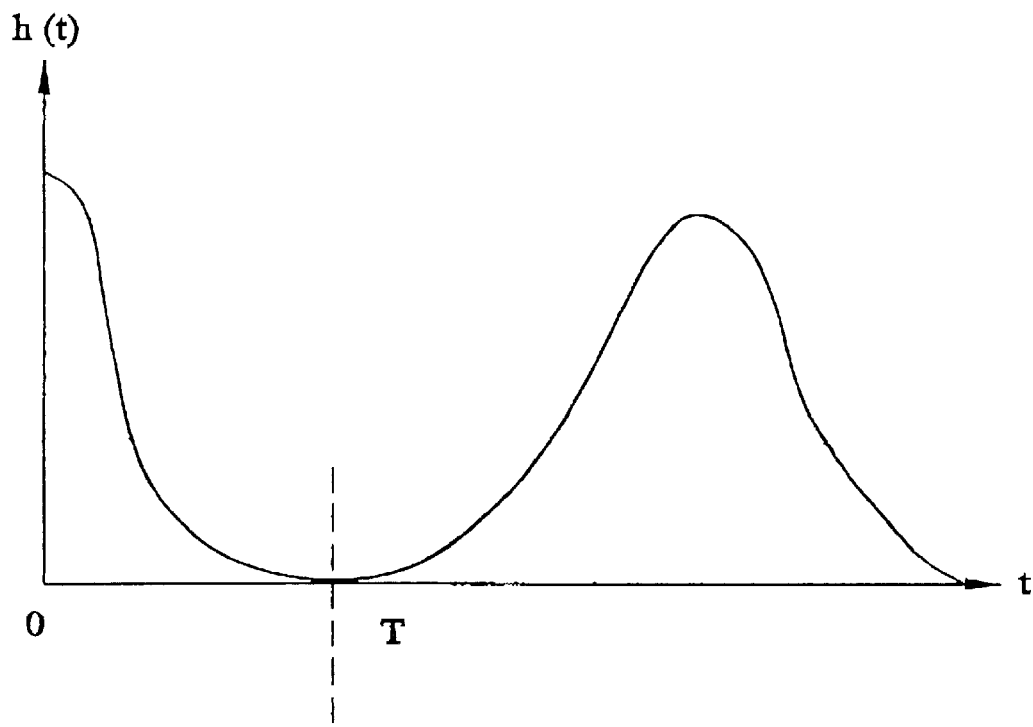
FIG. 1 is a histogram illustrating a first known type of technique for segmenting an image.
Figure 2:
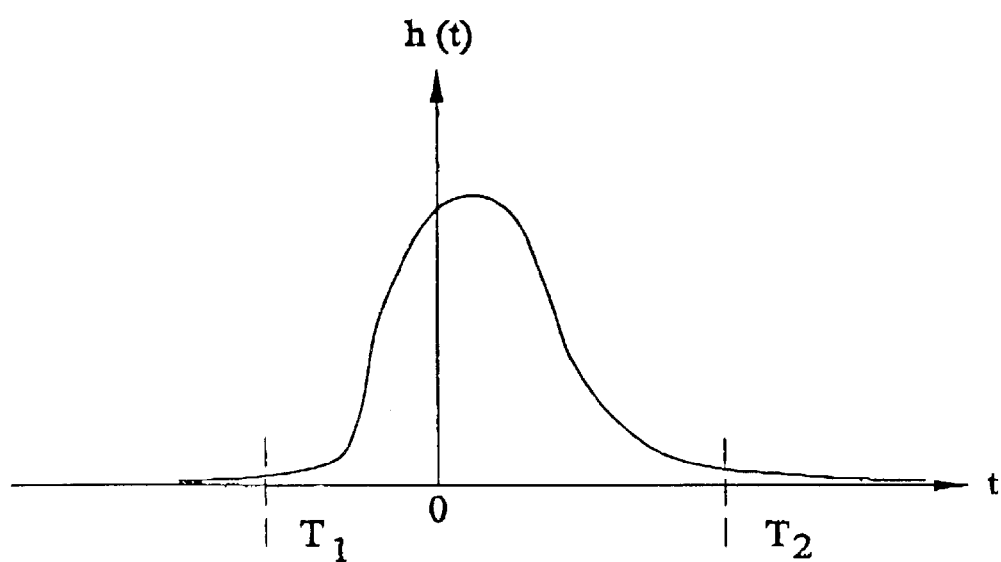
FIG. 2 is a histogram illustrating a second known technique for segmenting an image.

Like reference numerals refer to like parts throughout the drawings.

Figure 3:
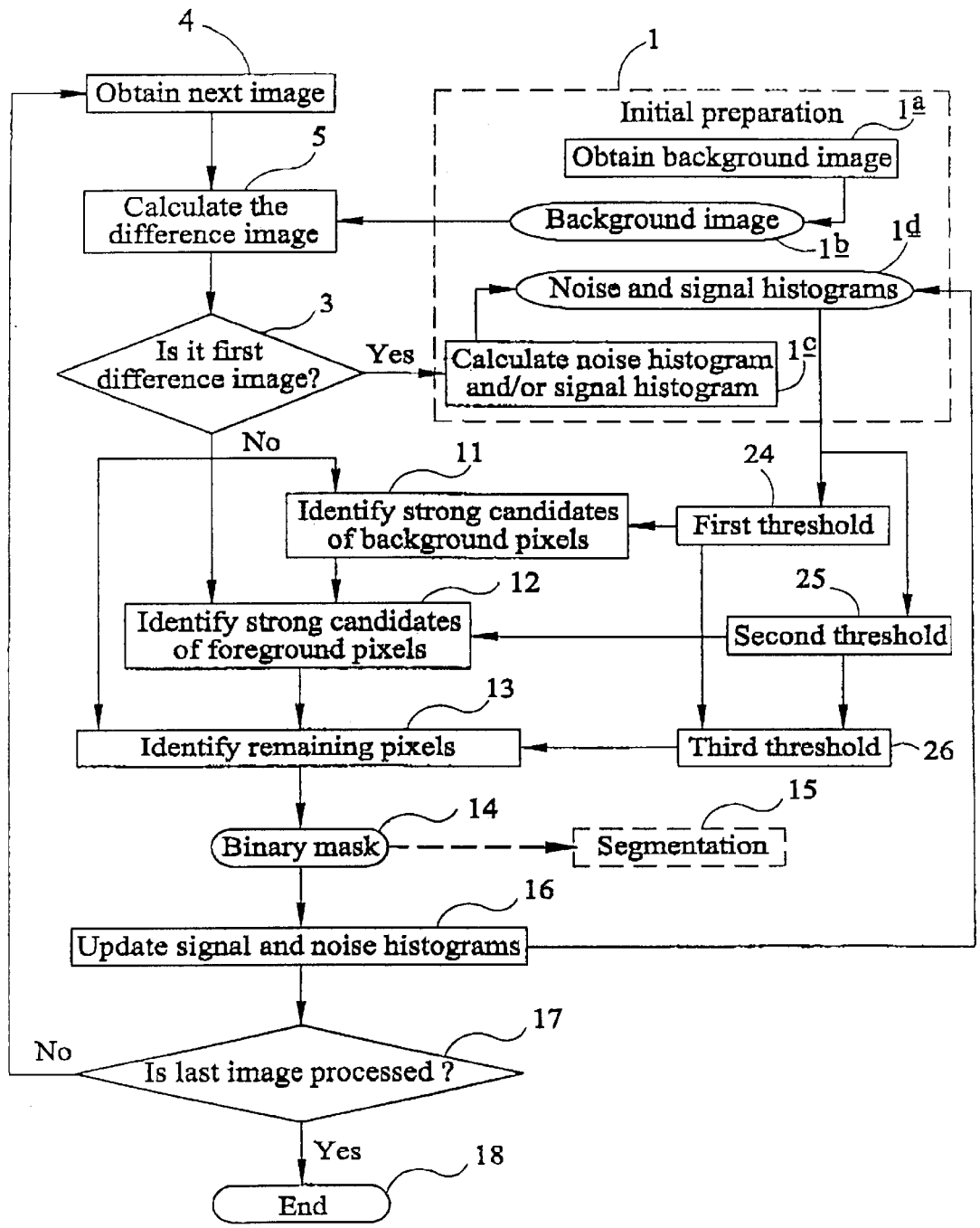
FIG. 3 is a functional diagram of a method of segmenting a sequence of images constituting an embodiment of the invention.

The block functional diagram of FIG. 3 is in the form of an "augmented" flow diagram illustrating the supply of data as well as the sequence of steps or operations. The method begins with an initial preparation 1 which records at 1a a non-occluded background image 1b i.e. an image of a background scene with no foreground objects. The background image 1b is supplied to a step 5 for calculating a difference image using a pre-defined function. As step 3 determines whether the first difference image is being processed. If so, a step 1c calculates a noise histogram and/or a signal histogram 1d from statistical properties of background and foreground regions of the first difference image.

Figure 4:
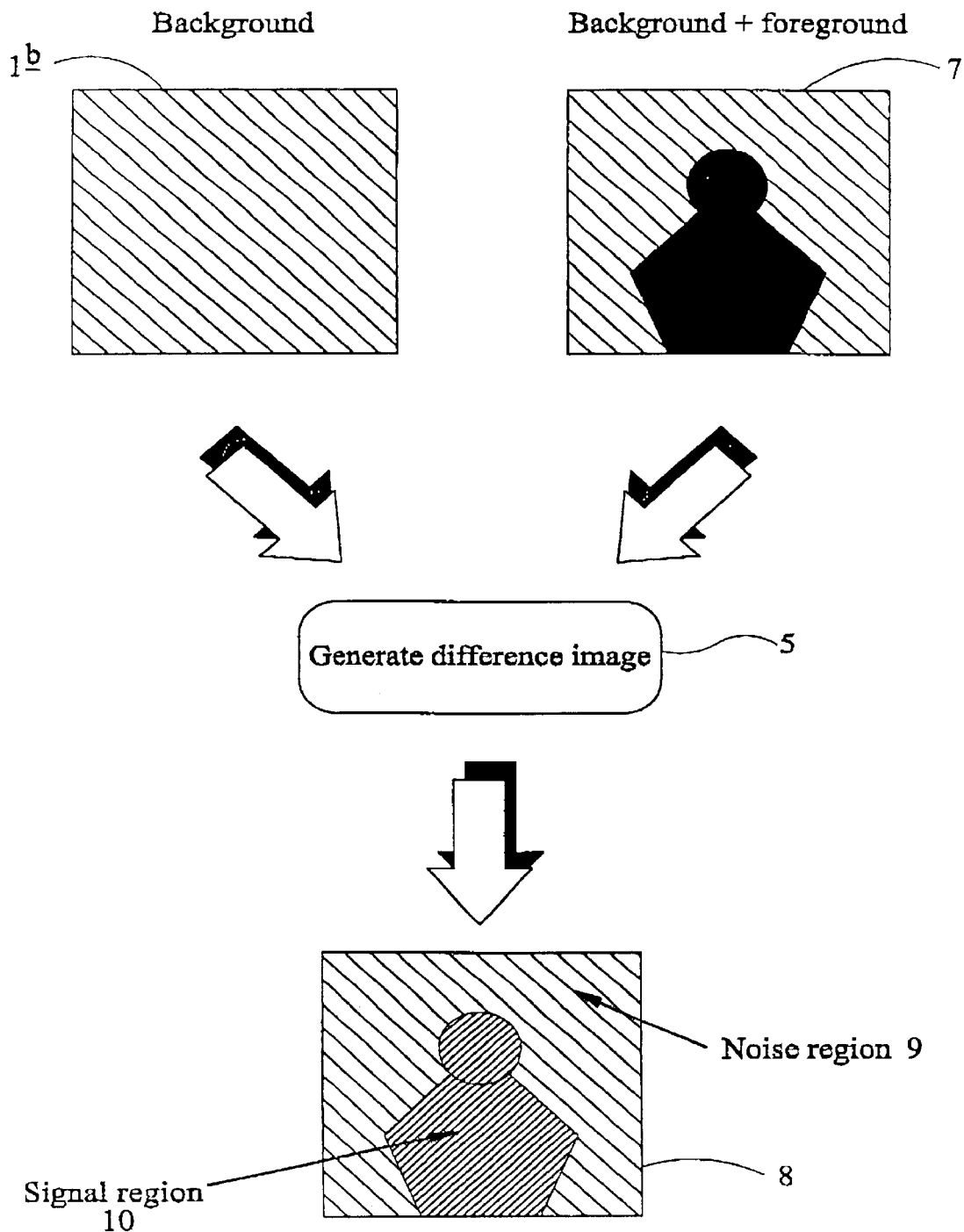
FIG. 4 is a diagram illustrating the generation of a difference image in the method illustrated in FIG. 3.

When the next image of the sequence is obtained by the step 4, this is supplied, together with the background image 1b, to the step 5, which calculates the next difference image. This is illustrated in FIG. 4, which shows the background image 1b and an image 7 of the sequence with the same background but also containing a foreground image. The step 5 calculates the difference Image which is illustrated at 8 in FIG. 4. The difference image has a noise region 9 where the pixels have values mainly or wholly representing noise. The image 8 also has a signal region 10 corresponding to the foreground image with the pixels thereof representing a difference between the image pixel and the corresponding background pixel of the background image 1b.

The step 3 determines that the difference image is not the first difference image. Control passes to a step 11, which identifies strong candidates for background pixels in the difference image. In particular, each pixel in turn is compared with a first threshold, which is determined in a step 24 in accordance with the statistical property of the noise determined in the step 1c. Pixels whose values are below the first threshold and which are surrounded by a majority of neighbouring pixels whose values are below the first threshold are allocated to the background region (or one of the background regions where there are more than one such region).

A step 12 identifies strong candidates for foreground pixels by comparing each difference image pixel not allocated to the at least one background region in the step 11 with a second threshold, which is determined in a step 25 in accordance with the signal strength histogram of the signal region 10 determined in the step 1c. Those pixels whose values are greater than the second threshold and which are surrounded by a majority of neighbouring pixels whose values are above the second threshold are allocated to the or each foreground region.

A step 13 then identifies whether the pixels not already allocated to the background or foreground regions should be allocated to the at least one background region or the at least one foreground region. Each such pixel is compared with a third threshold, which is determined in a step 26 from and has a level between the first and second thresholds. Those pixels whose levels are below the third threshold are identified as candidate background pixels. Each of the candidate background pixels is then allocated to the at least one background region if a majority of the neighbouring pixels have already been identified as background pixels or as candidates for background pixels. The remaining pixels are then allocated as foreground pixels.

In each of the steps 11,12 and 13, it is convenient for the whole of the difference image to be thresholded followed by the "spatial filtering" to determine how the pixel is to be allocated. However, for pixels near the edges and corners of each image, the neighbourhood of each pixel is restricted. Although the spatial filtering may be performed in the same way all the way to the image boundary, it may be more appropriate, at least in some applications, to restrict the spatial filtering to a middle portion of the or each image where each pixel has a full complement of neighbouring pixels. This leaves a surrounding margin unfiltered.

For example, if the image size is M×N pixels and the window size used in the spatial filtering is m×n pixels, then the central region comprising (M−m+1)×(N−n+1) pixels is subjected to the spatial filtering and the pixels in the surrounding margin may be spatially filtered using an appropriately smaller window size or may be left spatially unfiltered. For applications where the segmentation does not need to be so precise, the allocation of the pixels in the surrounding margin may be determined solely using the thresholding and without the filtering process.

A step 14 forms a binary mask. In particular, the mask comprises elements corresponding to the pixels of the difference image. Each pixel of the binary mask is ascribed a first value if the corresponding difference image pixel is allocated to the at least one background region or a second value different from the first value if the corresponding difference image pixel is allocated to the at least one foreground region. The binary mask thus represents the desired segmentation as illustrated at 15 and may be used for further processing of the image. For instance, the background regions of the image may be replaced by the corresponding pixels of the background image itself. Alternatively, the pixels of the background regions may be replaced by corresponding pixels of a different background image, which may be a fixed image or a temporally varying image, to provide special effects. In this case, in order for the background and foreground regions to blend together in a more visually acceptable way, each of the boundary pixels of the foreground regions may be replaced by a value representing a linear combination of the value of the image pixel and the value of the corresponding new background pixel.

A step 16 updates the signal and noise histograms on the basis of an analysis of the current image of the sequence and the updated histograms are returned to the step 3 so as to be available for segmenting of the next image of the sequence. A step 17 determines whether the last image of the sequence has been processed. If not, control returns to the step 4, in which the next image Is obtained and the steps 5 and 11 to 17 are repeated. Otherwise, the method ends at 18.

The sequence of images may comprise a video sequence of a scene containing objects moving in front of a substantially static background which remains relatively unchanged during the image processing.

For some applications, it may not be necessary to perform the step 13 for identifying the remaining pixels. Also, for some applications, it may not be necessary to perform both of the steps 11 and 12. Instead, it may be sufficient to perform only one of these steps.

It is also possible to repeat the steps shown in FIG. 3 for each image of a sequence, for example where the images are being processed off-line or where there is sufficient computing power to repeat the steps in real time for a sequence of video images, for example from a video camera. By repeating the steps, the noise and signal histograms can be updated on the basis of the segmentation of the current image. This in turn allows an improved segmentation of the current image, which may then be used to refine the signal and noise histograms. Any suitable criterion for stopping this process for each image may be used. For example, a predetermined number of such "iterations" may be performed. Another possibility is to repeat the steps until the noise and signal histograms remain substantially unchanged from one iteration to another.

In applications where both of the steps 11 and 12 are performed, it is believed that there is some advantage in performing the step 11 to identify background pixels before performing the step 12 to identify foreground pixels. However, there may be some applications where the reverse is the case. Also, in the step 13, the remaining pixels may be identified first as foreground pixels by thresholding and allocation on the basis of the neighbouring pixels so that the residual unallocated pixels would then be identified as background pixels by default.

The individual techniques used in the method illustrated in FIG. 3 will now be described in more detail.

The nth frame of the video sequence may be denoted as a digital image $I^n(x, y)$, for n=1, 2, ..., where (x, y) are the discrete coordinates of each pixel. The background image is denoted as B(x, y), which is pre-captured when there are no moving objects in the scene. In each image $I^n(x, y)$, if a pixel belongs to a foreground object, it is referred to as a foreground pixel or an object pixel. Likewise, a pixel in the background that is not blocked by a foreground object is referred to as a background pixel.

The step 5 defines a difference image, $D^n(X, y)$ which is given by:

$$D^n(x,y)=F[I^n(x,y),B(x,y)]$$

where F is a user-defined measurement that characterises the difference between $I^n(x, y)$ and B(x, y). For simplicity the superscript n in the above equation will be omitted in the following description.

In the simplest case where both I(x, y) and B(x, y) are grey level images, for example, D(x, y) may be defined as their direct difference, i.e.

$$D(x,y)=I(x,y)-B(x,y)$$

In the ideal case where there is no noise, the value of such a D(x, y) Is then given by:

$$D(x, y) = \begin{cases} s(x, y) & \text{if current pixel} \in \text{foreground objects} \\ 0 & \text{if current pixel} \in \text{backround} \end{cases}$$

where s(x, y) is a measurement of the signal and $\epsilon$ means "is a member of". The term s(x, y) represents a difference measurement between an object pixel and the pixel at the same position in the background image. If all foreground pixels have yielded non-zero signal values, then they can be identified and separated from those background pixels which give a difference measurement of zero.

This simple approach does not work in practice because there is always noise in the image and it is always possible that some object pixels may have identical values to those corresponding pixels in the background image. To include the effect of noise, the last equation may be modified as:

$$D(x, y) = \begin{cases} s(x, y) + n(x, y) & \text{if current pixel} \in \text{foreground objects} \\ n(x, y) & \text{if current pixel} \in \text{backround} \end{cases}$$

where the noise term n(x, y) is assumed to be a random variable with a mean value of zero and a variance of $\sigma$.

To enable the segmentation of the foreground pixels from the background pixels, the strength of the signal has to be significantly stronger than that of the noise. The above equation may then be rewritten as:

$$D(x, y) = \begin{cases} s(x, y) & \text{if current pixel} \in \text{foreground objects} \\ n(x, y) & \text{if current pixel} \in \text{backround} \end{cases}$$

where s(x, y) in the above equation may be regarded as containing an element of noise, which in practice may not be distinguishable from the actual signal itself.

The simplest way to separate the signal term s(x, y) from the noise term n(x, y) is to find a threshold T such that all foreground pixels have signal values exceeding T and all background pixels have noise values below T. A binary masking function may then be derived as:

$$M(x, y) = \begin{cases} 1 & \text{if} |D(x, y)| \geq T \\ 0 & \text{otherwise} \end{cases}$$

where 1 denotes a foreground pixel and 0 a background pixel.

This is possible with some restrictive conditions, for instance, when the background is in a uniform colour such as deep blue. The difference image D(x, y) may be calculated using equation (3) which is described hereinafter. If the foreground objects do not contain regions of the same deep blue and if the noise level of the imaging system is low, the difference image should have strong signal values for the foreground regions with very small values in the background regions. It is then possible to find a threshold T to separate these signal and noise values.

In practice, this simplistic method may not work satisfactorily for a general scene of the background. For example, some foreground pixels may be similar to the corresponding background pixels and produce signal values that may be below any given threshold T. Similarly, some background pixels may produce noise values above T. There are many possible reasons that might cause this latter problem, including the presence of electronic noise in the imaging system, lighting changes in the background, and/or small disturbances of the imaging system. The multiple thresholds of the present method substantially overcome this problem as described hereinafter A colour image may be decomposed into red (R), green (G) and blue (B) components. Alternatively it may be represented in other colour formats such as YUV or HSV. For simplicity, the following discussion assumes the image is in the RGB format, but the techniques remain valid for other colour formats. All equations may be adapted for other colour formats by replacing the RGB colour components with either YUV or HSV components.

A commonly used difference measurements between two images I(x, y) and B(x, y) is the colour distance:

$$F\{I, B\} = \sqrt{\alpha(R_I - R_B)^2 + \beta(G_I - G_B)^2 + \gamma(B_I - B_B)^2} \quad (1)$$

where $\alpha$, $\beta$, and $\gamma$ are weighing factors and $\{R_I, G_I, B_I\}$ and $\{R_B, G_B, B_B\}$ are the RGB colour components for the images I(x, y) and B(x, y), respectively.

It is of often tempting to normalise the colour components in the above equation. The normalisation is achieved by dividing each colour component by the sum of the colour components. For example, the $R_I$ component may be normalised as:

$$R'_I = \frac{R_I}{R_I + G_I + B_I}$$

An example of F using such a normalised colour format is given by:

$$F\{I,B\} = \sqrt{\alpha(R'_I - R'_B)^2 + \beta(G'_I - G'_B)^2 + \gamma|Y_I - Y_B|}$$

where $Y_I = R_I + G_I + B_I$ and $Y_B = R_B + G_B + B_B$. While this normalisation is useful in reducing the influence due to different lighting intensity, there is a drawback when the value of $Y_I$ or $Y_B$ is very small. The division by a very small value will result in a very large amplification of the noise elements in each colour component, thus making any segmentation method difficult. This normalisation should therefore be applied with care.

To reduce the computing cost, the colour distance measurement described in equation (1) may be approximated as:

$$F\{I,B\} = \alpha|R_I - R_B| + \beta|G_I - G_B| + \gamma|B_I - B_B| \quad (2)$$

The weighting factors may be pre-determined to reflect the importance of each colour component. A typical set of values, $\alpha = \beta = \gamma = 1$, has been found adequate for many applications. This leads to:

$$F\{I,B\} = |R_I - R_B| + |G_I - G_B| + |B_I - B_B| \quad (3)$$

There are other methods for defining the difference measurement function F. For example, an entropy measurement may be used which is based on the statistical property of the signal and the noise. Such a method may yield better difference characteristics but tends to be more computing intensive.

Based on the difference measurement function F as described by equation (3), the difference image D(x, y) is given by:

$$D(x, y) = \begin{cases} |s_r(x, y)| + |s_g(x, y)| + |s_b(x, y)| & \text{for foreground pixels} \\ |n_r(x, y)| + |n_g(x, y)| + |n_b(x, y)| & \text{for foreground pixels} \end{cases} \quad (4)$$

where the noise in each colour component is assumed to be a random variable with a mean value of zero and a variance of $\sigma$. These random variables are also assumed to be independent from one colour channel to another and from one pixel to another.

In theory, the values of the noise $n_r$, $n_g$ and $n_b$ can vary from negative infinity to positive infinity. In a real computer implementation, these values may be represented by integers within a finite range, for example from −N to +N, where N is an integer and is typically equal to 255. The values of $|n_r|$, $|n_g|$ and $|n_b|$ then vary from 0 to N.

There is a reason for denoting noise terms as $|n_r|$, $|n_g|$ and $|n_b|$ with the absolute value operator $||$. This will become clearer in the later discussion of noise reduction by imaging averaging, which is applied before the absolute operations are applied.

Figure 5:
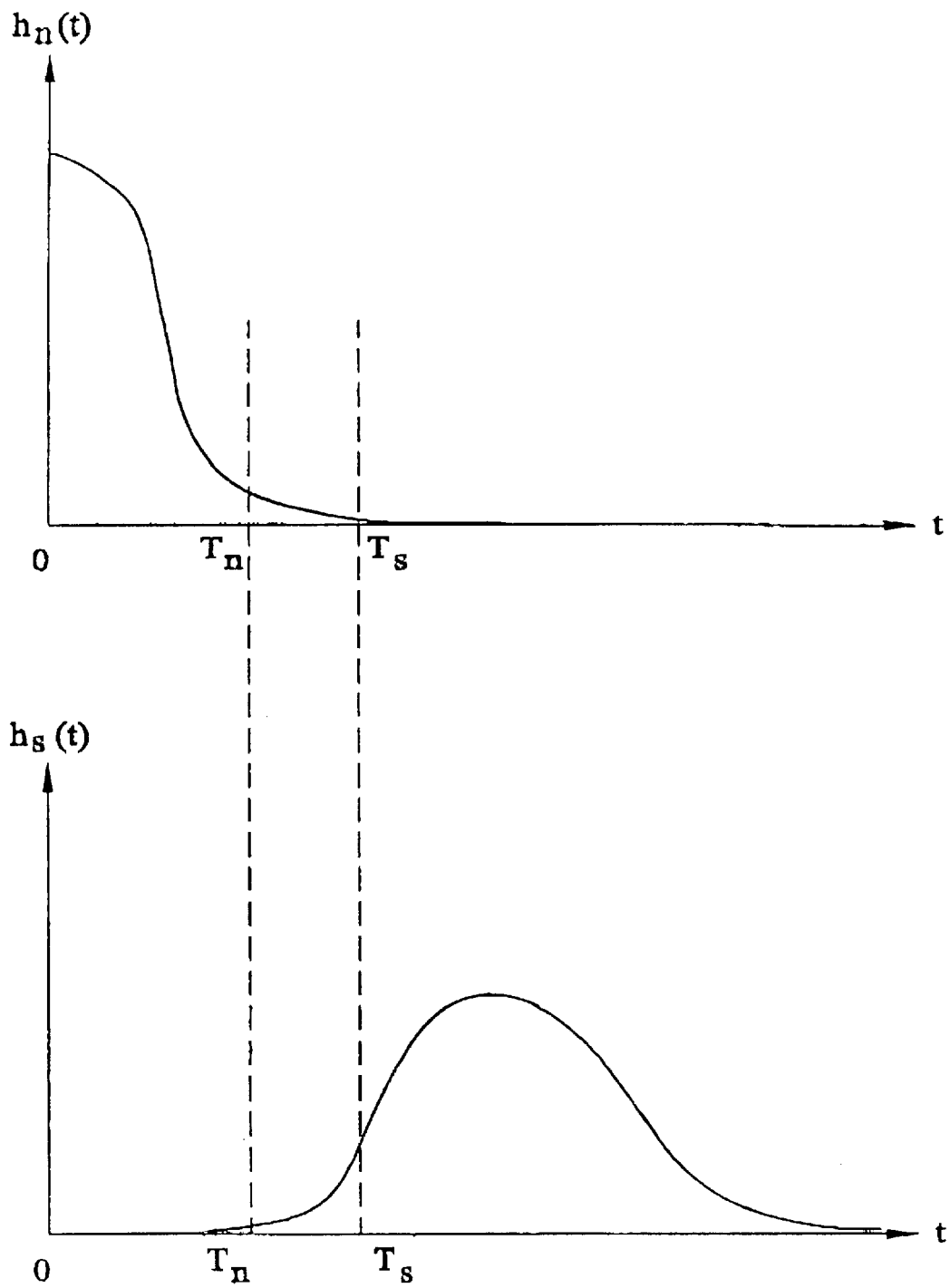
FIG. 5 illustrates noise and signal histograms formed in the method illustrated in FIG. 3.

The statistical property of the noise may be estimated initially using a histograming method. For example, if the image I(x, y) contains the background only and is captured at a different time from when B(x, y) is captured, then the difference image D(x, y) represents the noise variable in each pixel. A histogram, $h_n(t)$, may then be constructed by counting the total number of occurrences of a particular noise value t, at which $D(x, y) = |n_r| + |n_g| + |n_b| = t$. The upper graph of FIG. 5 illustrates an example of such a noise histogram.

Theoretically, the value of $|n_r| + |n_g| + |n_b|$ varies from 0 to 3N. This means that $h_n(t)$ should have 3N elements or bins, each being an integer counter. However, the value of $|n_r| + |n_g| + |n_b|$ will be equal to 3N if and only if all the three terms reach their maximum value of N. In practice, the value of $|n_r| + |n_g| + |n_b|$ is likely to be far below this maximum value of 3N. Often it is adequate to use a histogram of only N bins. For those pixels that exceed the value of N, their values can be truncated to N. This is useful when the computing power and the memory storage are limited.

The noise histogram may be calculated from all background pixels in the image. It may be accumulated over several frames of images, so that it can better approximate the statistical property of the noise.

This noise histogram has to be calculated before the segmentation starts. On the other hand, it can only be calculated if the background pixels are already known. One possible solution to these contradictory requirements is to ensure that the first image or, even better, the first few images contain the background scene only so that the noise histogram may be initially calculated using these images.

For some applications such as the Sharp® Corporation MPEG-4 Internet ViewCam, this may be achieved by starting recording images just before a "target" moves into the field of view. After the video camera has been switched on for a couple of seconds, the target may then enter the field of view. This ensures that the first few images contain the background only.

Figure 6:
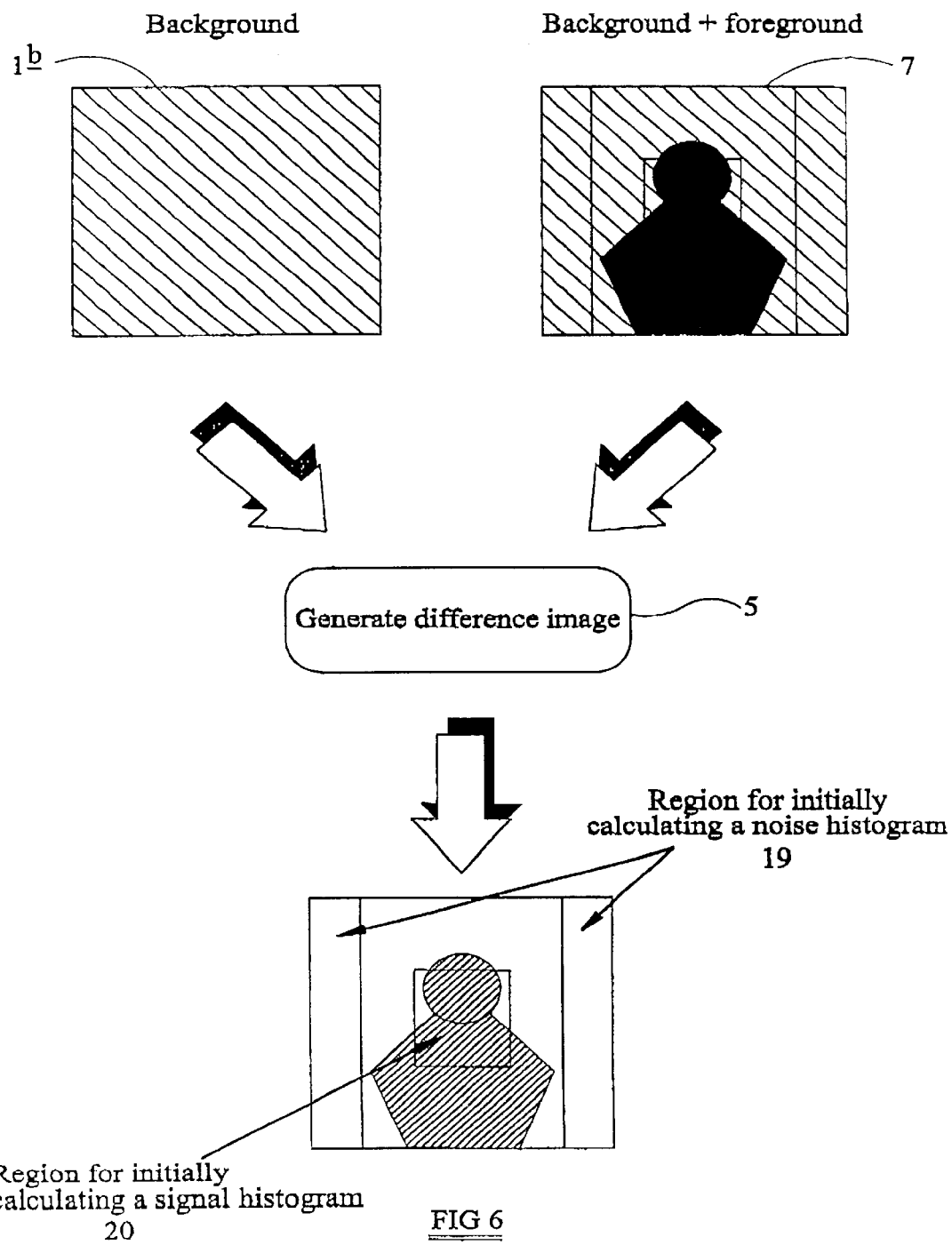
FIG. 6 is a diagram illustrating a technique for the initial calculation of the noise and signal histograms.

Alternatively, the or each target may be initially positioned at the centre region of the image with some regions 19 on the left and the right margins which contain the background only, as illustrated in FIG. 6. The regions 19 on the left and the right margins may be used to estimate the noise histogram. For applications such as the Sharp® Internet ViewCam, this may be achieved by displaying a rectangular guide at the centre of the image with the user only starting recording when the targets are at the centre. This constraint may be needed for the first few images only and thereafter the target may move freely.

If the computation is carried out off-line for some applications, it is also possible to allow the user to select manually background regions for estimating the noise property. If the application is implemented on a personal computer (PC), for example, an image may be displayed on the monitor and the user may use a mouse pointer to select a region for this purpose.

Similarly, a histogram $h_n(t)$ of the signals for foreground pixels is constructed. Again, there is a need to know the foreground objects before this can be achieved. If the targets are initially centred at the centre region 20 of the image as illustrated in FIG. 6, then this is possible by using the centre region for calculating the signal histogram. Alternatively a manual method as described above may be used to identify regions for the initial estimation of the signal histogram.

These restrictions may not be possible for all applications so that, in general, this initial estimation of the signal histogram may not be possible before the first image containing moving objects is segmented. This will be described hereinafter.

The signal and noise histograms together form the basis for determining thresholds for segmenting the images.

Once the difference image is calculated, strong candidates of background pixels are determined first using a first threshold $T_n$. The value of this threshold is so determined that most foreground pixels have signal values above it and most background pixels have noise values below it.

This threshold is determined from the noise histogram $h_n(t)$. Ideally the noise value is bounded so that only the first few bins of the histogram are not zeros. The threshold $T_n$ is then the first value of t, above which the rest of bins are zeros. That is:

$$h_n(t) = 0 \text{ for any } t \geq T_n$$

Unfortunately, such a near ideal situation does not normally exist. In practice, the background may contain a general scene instead of a controlled and uniform colour region. The imaging system may be subjected to higher than negligible noise, the lighting may change during the imaging process, or the imaging system may be disturbed slightly during the imaging process. All this will contribute to the noise terms whose values may occupy the whole range of the histogram.

While the histogram may not be all zeros over the higher range of t, the majority of the noise values are usually clustered around the first few bins of the histogram as illustrated in FIG. 5. The rest of the bins tend to form a long tail that decreases in general as t increases. The threshold $T_n$ may then be defined as the smallest value of t that is larger than a given percentage of the background pixels.

This threshold $T_n$ is then related to a pre-set percentage value $\eta_n$, where $0.5 \leq \eta_n \leq 1$. It is determined as the smallest $T_n$ that satisfies the following inequality:

$$\sum_{0}^{T_n} h_n(t) \geq \eta_n \cdot K_n$$

where $K_n$ is the total number of background pixels and is given by:

$$K_n = \sum_{0}^{N} h_n(t)$$

The difference image is then thresholded using the first threshold $T_n$ to identify strong candidates for background pixels. A binary mask is given by $$M_n(x, y) = \begin{cases} 0 & \text{if } |D(x, y)| \leq T_n \\ 1 & \text{otherwise} \end{cases}$$

where 0 denotes a strong candidate for a background pixel and 1 those other pixels which could be either foreground pixels or background pixels that fall to pass the threshold. Only the strong candidates for background pixels are of interest here. Those other pixels will be further classified in the processes described hereinafter. For an image I(x, y) containing $K_n$ background pixels, about $\eta_n \cdot K_n$ pixels will have noise values below the threshold $T_n$. The remaining $(1-\eta_n) \cdot K_n$ pixels will have values exceeding this threshold $T_n$ and will fail to be detected as background pixels in this process.

The implicit assumption here is that most of the foreground pixels have signal strengths exceeding the first threshold. It is possible, however, that a small number of foreground pixels might have signal values that fall below this threshold. This simple thresholding method will falsely classify them as background pixels.

If the value of $\eta_n$ is set higher, then the value of $T_n$ is also higher and fewer background pixels will fail to be detected. On the other hand, a larger threshold $T_n$ means it is easier for some foreground pixels to be falsely classified as background pixels. Since an objective of the segmentation is to separate the moving objects from the background, Ideally the segmentation should be able to tell any difference between the foreground objects and the background even when the signal values are small. This means that, for segmentation purposes, the smaller the threshold $T_n$ the better. A compromise is therefore necessary and typically $\eta_n$ is set to 0.75.

A true background pixel does not exist in isolation but is always connected to other background pixels. If a pixel is indeed a background pixel, then It is likely that most of its neighbouring pixels are also background pixels. Meanwhile, those foreground pixels that are falsely detected as background pixels often present themselves as small artefacts in the background. This observation leads to the following filtering method to remove these falsely detected pixels.

For each current candidate of background pixel, a small neighbourhood, usually a square window centred at the current pixel, is selected. If the total number of pixels in this window is m, then it is expected that about $\eta_n \cdot m$ pixels are correctly classified as background pixels where $\eta_n > 0.5$. This is correct if the value of m is sufficiently large.

If a background pixel is in the vicinity of a foreground object, the small window may contain some foreground pixels. Intuitively, about half of its neighbouring pixels are background pixels and about half are foreground pixels, even if the current background pixel is adjacent a foreground object. Obviously this is correct only if the window size is sufficient small. This conflicts with the above requirement that m should be "sufficiently larger".

A compromise is therefore necessary. Heuristic results show that a typical value of m is 100, thus giving a window size of 9×9 or 11×11 pixels. It is usual to have odd numbers for the window size, so that the current pixel is arranged at the centre of the window.

A candidate for a background pixel may then be accepted or rejected based on the percentage $\psi_n$ of background pixels in this neighbourhood. If $\psi_n$ is larger than or equal to 0.5, then it is accepted; otherwise it is rejected:

$$M_n(x, y) = \begin{cases} 0 & \text{if } M_n(x, y) = 0 \text{ and } \psi_n \geq 0.5 \\ 1 & \text{otherwise} \end{cases}$$

Computationally, this process may be implemented as a moving window averaging operation applied to the binary image $M_n(x, y)$ followed by a thresholding method with a threshold of 0.5.

Similarly, the strong candidates for foreground pixels may be detected using a second threshold $T_s$, which may be calculated from the signal histogram $h_s(t)$. As indicated earlier, the signal histogram may not be initially available until the first image is segmented. For the first image, this threshold may be simply estimated from $T_n$ and is given as:

$$T_s = \mu T_n$$

where $\mu$ is a real number larger than 1. Typically $\mu$ is set to 1.5 to 2.

The above equation is used only for the initial estimation of the signal strength before the first image is fully segmented. This equation may not be used if there Is additional information about the initial position of the foreground targets. If the foreground objects are initially centred at the centre of the image as illustrated in FIG. 6, for instance, the central region of the image may then be used to construct the initial signal histogram.

In general, the signal histogram $h_s(t)$ Is constructed from the segmented foreground objects, which are available as soon as the first image is segmented. The second threshold $T_s$ is then defined as the largest value of t satisfying the following inequality:

$$\sum_{T_s}^{N} h_s(t) \geq \eta_s \cdot K_s$$

where $0.5 < \eta_s \leq 1$ and $K_s$ is the total number of foreground pixels. A typical value of $\eta_s$ is 0.75.

Normally the threshold $T_a$ is larger than $T_n$. If this is not the case, then it means that the intensity and colour of the moving objects are so similar to the background that their difference is smaller than the noise effect. The segmentation will then become very difficult.

Once the second threshold $T_s$ is obtained, it is used to threshold the difference image to detect strong candidates for foreground pixels. A binary mask is obtained after the thresholding:

$$M_s(x, y) = \begin{cases} 1 & \text{if } M_n(x, y) = 1 \text{ and } |D(x, y)| \geq T_s \\ 0 & \text{otherwise} \end{cases}$$

Those pixels already identified as strong background pixels do not need to be processed again but they will contribute to the filtering process as described below.

For an image I(x, y) containing $K_s$ foreground pixels, about $\eta_s \cdot K_s$, pixels will have signal values above the threshold $T_s$. The remaining $(1-\eta_s) \cdot K_s$ pixel will have values below this threshold $T_s$ and will not be detected as foreground pixels in this process. As in the detection of the strong candidates for background pixels, there are false detections of background pixels as foreground pixels if the noise values pass the second threshold $T_s$. These falsely detected pixels are normally distributed randomly in isolation and may be removed using a moving window operation similar to the one described hereinbefore. The criterion is also similar. If an initially identified candidate foreground pixel has at least half of its neighbouring pixels as candidates for foreground pixels, then it is confirmed as a foreground pixel: otherwise it is rejected.

$$M_s(x, y) = \begin{cases} 1 & \text{if } M_s(x, y) = 1 \text{ and } \psi_s \geq 0.5 \\ 0 & \text{otherwise} \end{cases}$$

where $\psi_s$ is the percentage of strong candidates for foreground pixels in the small neighbourhood of the current pixel. The neighbourhood is usually selected as a square window centred at the current pixel. Its size is normally set to 9×9 or 11×11, as for detecting strong candidates for background pixels. Sometimes, if the foreground objects are small, this window size may be reduced.

Those pixels that are neither accepted as strong candidates for background pixels nor as foreground pixels may be classified in a further thresholding and filtering process. A third threshold $T_m$ is introduced and has a value between the thresholds $T_n$ and $T_s$ given by $$T_m = \alpha T_s + (1-\alpha) T_n$$

where $0 < \alpha < 1$. Typically the value of $\alpha$ may be set to 0.5.

The difference image is thresholded again using this third threshold $T_m$. This time, however, only those remaining pixels need be processed. The new binary mask function is given by:

$$M_n(x, y) = \begin{cases} 1 & \text{if } M_s(x, y) = 1 \\ 0 & \text{if } M_n(x, y) = 0 \\ 1 & \text{if } M_n(x, y) = 0 \text{ and } M_s(x, y) = 1 \text{ and } |D(x, y)| \geq T_m \\ 0 & \text{otherwise} \end{cases}$$

As in the previous processes, a filtering operation is applied to the "undetermined" pixels. If more than half the pixels in the window are background pixels, then the current pixel is classified as a background pixel and otherwise as a foreground pixel. A binary mask is finally given by $$M(x, y) = \begin{cases} 1 & \text{if } M_s(x, y) = 1 \\ 0 & \text{if } M_n(x, y) = 0 \\ 1 & \text{if } M_m(x, y) = 1 \text{ and } \psi_m \geq 0.5 \\ 0 & \text{otherwise} \end{cases}$$

where M(x, y) Is the final binary mask and $\psi_m$ is the percentage of foreground pixels in a square window centred at the current pixel to be verified. As before, the window size is normally 9×9 or 11×11 but may be adjusted to fit different sizes of objects.

For computer implementation, the memory storage of $M_s$, $M_n$ and $M_m$ may be shared if different values are used to denote different types of candidates at different stages. For example, in the first process to determine strong candidate f or background pixels, strong candidates for background pixels may be denoted as 0 and otherwise 2 (instead of 1). In the second process, strong candidates for foreground pixels may be denoted as 1 and remaining pixels as 3. This is useful if memory storage is limited for applications such as Sharp® Internet ViewCam.

The binary mask M(x, y) can then be used to segment the image into foreground regions and background regions. The segmented foreground regions may then be further processed, for example, compressed to reduce data rate. The background regions may be discarded or replaced with other images to produce any user-desired special effect.

Once the image is segmented, the signal and the noise histograms may be re-calculated using the foreground and background regions, respectively. Also, the image may be saved together with the binary mask. The next image is then obtained and segmented by repeating the above processes.

The segmentation results can be improved if the noise level can be reduced. As mentioned earlier, the noise terms $n_r$, $n_g$, $n_b$ are independent random variables from pixel to pixel. Here the noise terms are the direct difference before the absolute value operation is applied. on the other hand, the signal values for foreground pixels tend to be correlated with each other over a small neighbourhood. For the red component, for example, a direct difference image $D_r$ may be obtained as:

$$D_r(x,y) = R_I(x,y) - R_B(x,y)$$

If a moving window averaging operation is applied to this image before the absolute value operation is applied, then the noise variance will be reduced while the averaged signal will remain about the same, provided that the window size is small. For simplicity, it is assumed that each of the noise terms $n_r$, $n_g$, $n_b$ has a variance of $\sigma$. For a window size of n×n pixels, the noise variance of the smoothed image is reduced from $\sigma$ to $\sigma/n$. Typically the window size is set to 3×3, so that the noise variance in each colour component is reduced by a factor of 3. This operation may be applied to all three colour components before the absolute value operator is applied to produce the difference image defined by equation (3).

Figure 7:
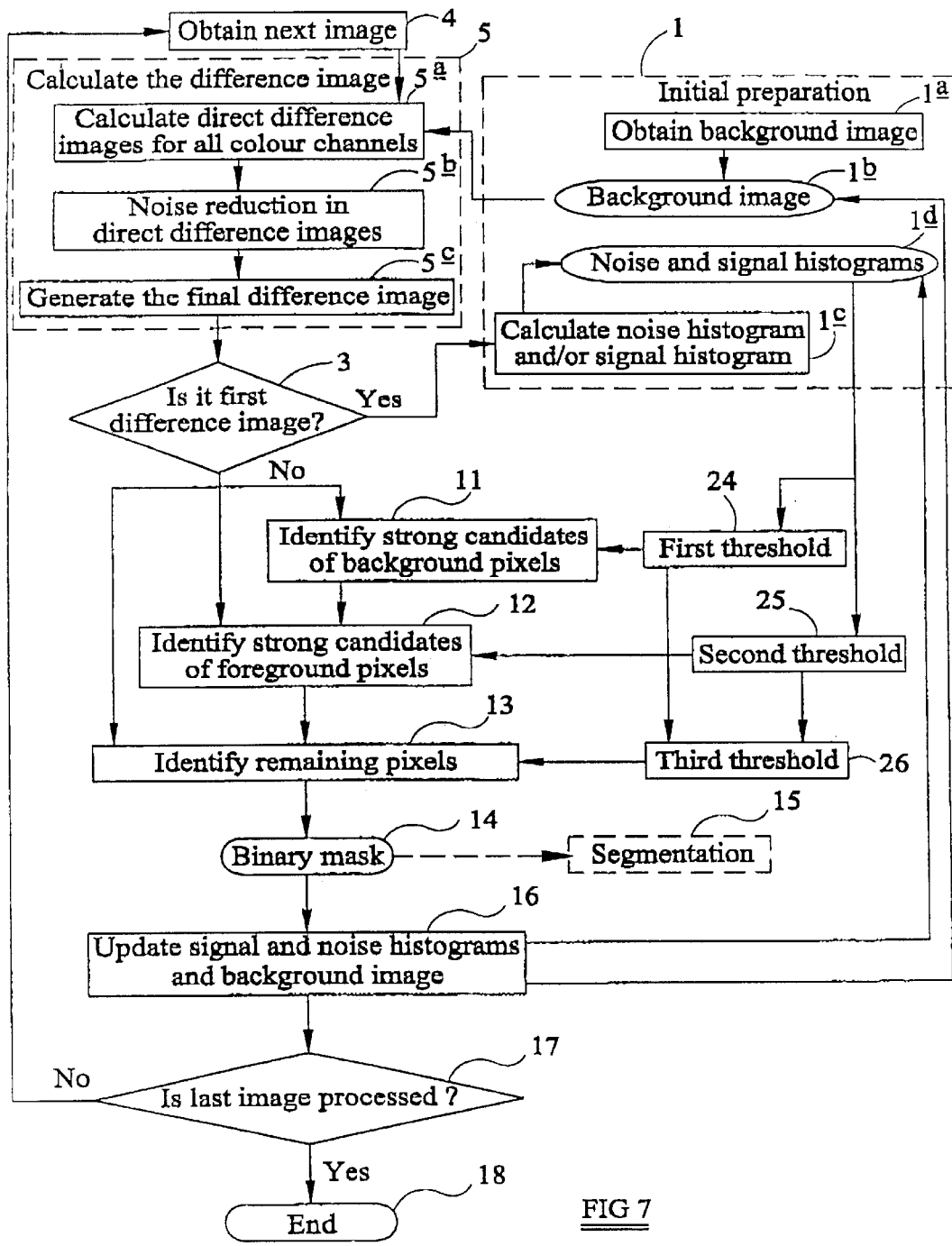
FIG. 7 is a functional diagram illustrating a method of segmenting a sequence of images constituting another embodiment of the invention.

FIG. 7 illustrates a method which differs from that illustrated in FIG. 3 in that it is modified to include noise reduction. The step 5 comprises sub-steps 5a to 5c. The step 5a calculates the direct difference images for all colour components or channels and the step 5b performs the moving window averaging operation so as to provide noise reduction in each of the direct colour component difference images. The step 5c then generates the final difference image.

As described hereinafter, the signal and noise histograms are re-calculated after the current image is segmented so that they always reflect the latest statistical property of the signal and the noise. This method could, however, be affected by the size of the foreground objects. Sometimes the foreground objects may be very large and may occupy almost all the image so that very little background remains in the image. Thus, very few pixels can be used to calculate the histogram of the noise and this affects the accuracy of the estimation. Similarly, the foreground objects could be small and the estimation of the signal histogram may be unreliable.

This problem may be solved by using a cumulative procedure to update the histograms. For example the signal histogram may be updated as:

$$H_s^t(x) = H_s(x) + \lambda H_s^{t-1}(x)$$

where $H_s^{t-1}(x)$ is the previous signal histogram used for segmenting the last frame, $H_s(x)$ is the new histogram obtained using the segmented results of the last frame and $\lambda$ is a constant which has a typical value of ½.

This is equivalent to having a weighted histogram derived partly from all previous ones with diminishing weighting, e.g.

$$H_s^t(x) = H_s(x) + \frac{1}{2}H_s^{t-1}(x) + \frac{1}{4}H_s^{t-2}(x) + \frac{1}{8}H_s^{t-3}(x) + \frac{1}{16}H_s^{t-4}(x) + \ldots$$

Similarly the noise histogram may be calculated using this cumulative method.

The extra computing power and memory storage that are required for this improved method need not be significant. This is because the computing cost of $H_s(x)$ consists of the main cost of this procedure and is required irrespective of whether the cumulative technique is used.

The background image may then be updated based on the segmented results. If the original image of the background is denoted as $B_0(x, y)$, the last image as $I(x, y)$ and the binary mask image as $M(x, y)$, then the new background image is given by:

$$B(x, y) = \begin{cases} [B(x, y) + B_0(x, y)]/2 & \text{if } M(x, y) = 1 \\ [B(x, y) + I(x, y)]/2 & \text{otherwise} \end{cases}$$

This is very useful to overcome small changes in the background, for example due to lighting changes or small disturbances due to camera movements.

FIG. 7 illustrates a modification to the step 16 of FIG. 3 to include this updating of the background image.

Once the segmentation is carried out, the static background may be removed and replaced with a new background image. The new background image may have a large contrast with the foreground objects thus having a clear cut-out at the boundary around the foreground objects. This may be "softened" by applying a smoothing operation for boundary pixels.

Figure 8:
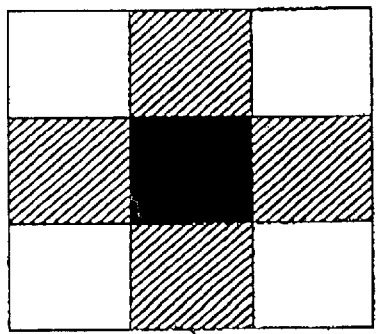
FIG. 8 is a diagram illustrated four-connected and eight-connected pixel neighbourhoods.
Figure 8:
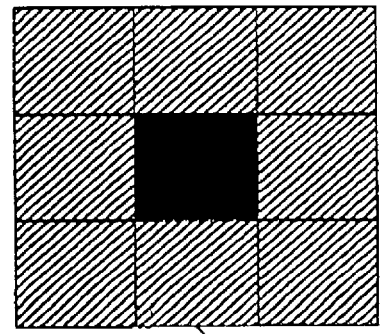

An object pixel is regarded as inside the object if all its adjacent pixels are also foreground pixels. These adjacent pixels may be defined as the 4-connected neighbours as illustrated at 22 in FIG. 8 or as the 8-connected neighbours as illustrated at 23 in FIG. 8. There is no operation required for object pixels inside the object.

If at least one of the adjacent pixels is a background pixel, an object pixel is then regarded as on the boundary. This pixel may be replaced by a new pixel given by:

$$I'(x,y) = \epsilon I(x,y) + (1-\epsilon)B'(x,y)$$

Where B'(x, y) is the user selected new background image and $\epsilon$ is a constant which has a typical value of ½.

The pre-recorded image of the background may differ from the actual background when there are foreground objects. Amongst the many factors that cause this problem, two are the most prominent:

1) The imaging device may have a white-balance automatic adjustment which may not be switched off;
2) The foreground objects block the incoming lighting from the background.

These problems result in a change in the intensity and colours in the background when there are foreground objects. If these changes are not significant, then they may be approximated as a constant in each colour component. That is, these changes may be denoted as:

$$\begin{cases} R(x, y) = R_0(x, y) + D_R \\ G(x, y) = G_0(x, y) + D_G \\ B(x, y) = B_0(x, y) + D_B \end{cases}$$

where $D_R$, $D_G$ and $D_B$ are constants independent of the position (x, y).

To estimate these constants, three histograms $H_R$, $H_G$ and $H_B$ are calculated from the following values $$\begin{cases} d_R(x, y) = 255 + R(x, y) - R_0(x, y) \\ d_G(x, y) = 255 + G(x, y) - G_0(x, y) \\ d_B(x, y) = 255 + B(x, y) - B_0(x, y) \end{cases}$$

where each colour component R, G and B is assumed to have a value in the range (0,255) and the constant 255 is added to ensure the values are in the range of (0,511) If there is no lighting change, each histogram should exhibit a peak at the position of 255. The difference between the actual peak position and 255 then represents the constant shift in the colour component and the background may be adjusted accordingly.

This correction of the background image is normally required only at the beginning before the first image is segmented. If there are lighting changes during imaging process, however, this process may be repeated after each frame is segmented. Alternatively, this may be carried out after a fixed number of images are segmented to reduce the computation cost.

Figure 9:
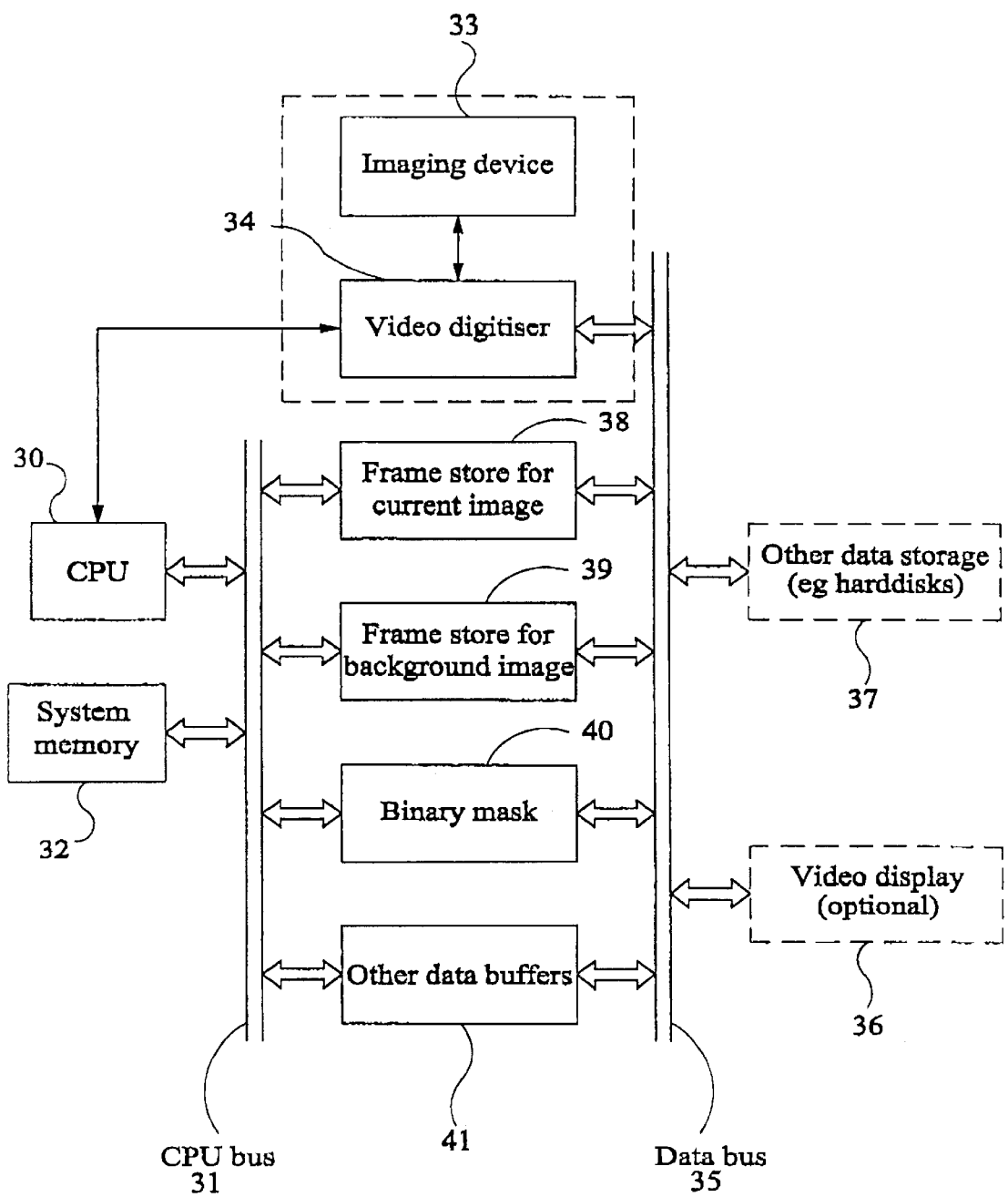
FIG. 9 is a block diagram of an apparatus for segmenting a sequence of images constituting a further embodiment of the invention.

The method may be performed on any suitable apparatus such as that illustrated in FIG. 9. A programmed data processor comprises a central processing unit (CPU) 30 connected to a CPU bus 31. A system memory 32 is connected to the bus 31 and contains all of the system software or program for operating the data processor.

The images are obtained by an imaging device 33, such as the Sharp® Internet ViewCam, which is connected to a video a digitiser 34 (if the image signal is not already in digital data format) connected to a data bus 35. An optional display device 36 may also be connected to the data bus 35 so that the input may be displayed in full screen or in a window if the output image is also displayed in another window.

Alternatively, the incoming images may be from other sources and may already be in the form of a computer file which may be stored in a hard disk or any other storage device 37 connected to the data bus 35.

The system comprises a frame buffer 38 for storing an incoming image, a frame buffer 39 for the image of the background, a frame buffer 40 for the binary mask and other memory buffers 41 as necessary for temporary data generated during the segmentation process.

The segmented foreground and background regions together with the binary mask may be sent to other devices for further processing or may be stored in other storage devices such as a hard disk.

A composed image may be generated using the segmented foreground region(s) and any user-designated new background image. The new composed image may be displayed on the display device 36 either in full screen or in a window for comparison with the original image as displayed in a separate window.

What is claimed is:

1. A method of segmenting a pixellated image, comprising the steps of:
    (a) selecting at least one first region from a first reference image;
    (b) deriving from values of pixels of the at least one first region a first threshold such that a first predetermined proportion of the pixels have values on a first side of the first threshold;
    (c) forming a difference image as a difference between each pixel of the image and a corresponding pixel of an image of a non-occluded background; and
    (d) allocating each difference image pixel to at least one first type of region if the value of the difference image pixel is on the first side of the first threshold and the values of more than a first predetermined number of neighbouring difference image pixels are on the first side of the first threshold.

2. A method as claimed in claim 1, characterised in that the first predetermined proportion is between 0.5 and 1.

3. A method as claimed in claim 2, characterised in that the first predetermined proportion is substantially equal to 0.75.

4. A method as claimed in claim 2, characterised in that the first predetermined number is substantially equal to half the number of neighbouring difference image pixels.

5. A method as claimed in claim 1, characterised in that each of the at least one first region and the at least one first type of region comprises at least one background region and the first side of the first threshold is below the first threshold.

6. A method as claimed in claim 5, characterised in that the first reference image comprises the difference between two images of the non-occluded background and the at least one first region comprises substantially the whole of the first reference image.

7. A method as claimed in claim 1, characterised in that the at least one first region is automatically selected.

8. A method as claimed in claim 7, characterised in that the at least one first region comprises at least one side portion of the first reference image.

9. A method as claimed in claim 1, characterised in that the at least one first region is manually selected.

10. A method as claimed in claim 1, characterised in that the neighbouring pixels in the step (d) are disposed in an array with the difference image pixel location substantially at the centre of the array.

11. A method as claimed in claim 1, characterised by repeating the steps (a) to (d) for a sequence of images having a common background.

12. A method as claimed in claim 11, characterised in that the first reference image is the preceding difference image.

13. A method as claimed in claim 12, characterised in that the at least one first region comprises the at least one first type of region of the preceding step (d).

14. A method as claimed in claim 13, characterised in that each step (d) comprises forming a first initial histogram of values of the difference image pixels allocated to the at least one first type of region and the step (b) derives the first threshold from a first resulting histogram which comprises the sum of the first initial histogram formed in the preceding step (d) and a first predetermined fraction less than one of the first resulting histogram of the preceding step (b).

15. A method as claimed in claim 14, characterised in that the first predetermined fraction is a half.

16. A method as claimed in claim 1, characterised by the steps of:
    (e) selecting at least one second region from a second reference image;
    (f) deriving from values of pixels of the at least one second region a second threshold such that a second predetermined proportion of the pixels have values on a second side opposite the first side of the second threshold; and (g) allocating each difference image pixel, which is not allocated to the at least one first type of region, to at least one second type of region if the value of the difference image pixel is on the second side of the second threshold and the values of more than a second predetermined number of neighbouring difference image pixels are on the second side of the second threshold.

17. A method as claimed in claim 16, characterised in that the second predetermined proportion is between 0.5 and 1.

18. A method as claimed in claim 17, characterised in that the second predetermined proportion is substantially equal to 0.75.

19. A method as claimed in claim 16, characterised in that the second predetermined number is substantially equal to half the number of neighbouring difference image pixels.

20. A method an claimed in claim 16, characterised in that each of the at least one second region and the at least one second type of region comprises at least one foreground region and the second side of the second threshold is above the second threshold.

21. A method as claimed in claim 16, characterised in that the at least one second region is automatically selected.

22. A method as claimed in claim 21, characterised in that the at least one second region comprises a middle portion of the second reference image.

23. A method as claimed in claim 16, characterised in that the at least one second region is manually selected.

24. A method as claimed in claim 16, characterised in that the second reference image comprises the first reference image.

25. A method as claimed in claim 16, characterised in that the neighbouring pixels in the step (g) are disposed in an array with the difference image pixel location substantially at the centre of the array.

26. A method as claimed in claim 16, characterised by repeating the steps (e) to (g) for a sequence of images having a common background.

27. A method as claimed in claim 26, characterised in that the second reference image is the preceding difference image.

28. A method as claimed in claim 27, characterised in that the at least one second region comprises the at least one second type of region of the preceding step (g).

29. A method as claimed in claim 28, characterised in that each step (g) comprises forming a second initial histogram of values of the difference image pixels allocated to the at least one second type of region and the step (f) derives the second threshold from a second resulting histogram which comprises the sum of the second initial histogram formed in the preceding step (g) and a second predetermined fraction less than one of the second resulting histogram of the preceding step (f).

30. A method as claimed in claim 29, characterised in that the second predetermined fraction is a half.

31. A method as claimed in claim 16, characterised by allocating each difference image pixel, which is not allocated to the at least one first type of region and which is not allocated to the at least one second type of region, as a candidate first type of pixel if a value of the difference image pixel is less than a third threshold.

32. A method as claimed in claim 31, characterised in that the third threshold is between the first and second thresholds.

33. A method as claimed in claim 32, characterised in that the third threshold is the arithmetic mean of the first and second thresholds.

34. A method as claimed in claim 31, characterised by allocating each difference image pixel, which is not allocated to the at least one first type of region and which is not allocated to the at least one second type of region, to the at least one first type of region if more than a third predetermined number of the neighbouring pixels are allocated to the at least one first type of region or as candidate first type of pixel.

35. A method as claimed in claim 34, characterised in that the neighbouring pixels comprise an array of pixels with the difference image pixel location substantially at the centre of the array.

36. A method as claimed in claim 34, characterised in that the third predetermined number is half the number of neighbouring difference image pixels.

37. A method as claimed in claim 34, characterised by allocating each difference image pixel, which is not allocated to the at least one first type of region and which is not allocated to the at least one second type of region, to the at least one second type of region.

38. A method as claimed in claim 1, characterised in that the or each image and the background image are grey level images and the step (c) forms the difference between each image pixel and the corresponding background pixel as the difference between the grey level of each image pixel and the grey level of the corresponding background pixel.

39. A method as claimed in claim 1, characterised in that the step (c) comprises performing a moving window averaging step on the or each difference image.

40. A method as claimed in claim 1, characterised in that the or each image and the background image are colour images and the step (c) forms the difference between each image pixel and the corresponding background pixel as a colour distance between the colour of each image pixel and the colour of the corresponding background pixel.

41. A method as claimed in claim 40, characterised in that the colour distance is formed as:

$$\sum_{i=1}^{n} \alpha_i |I_i - B_i|$$

where n is the number of colour components of each pixel, $I_i$ is the ith colour component of an image pixel, $B_i$ is the ith colour component of a background pixel and $\alpha_1$ is a weighting factor.

42. A method as claimed in claim 41, characterised in that each $\alpha_1$ is equal to one.

43. A method as claimed in claim 41, characterised in that n is equal to 3, $I_1$ and $B_1$ are red colour components, $I_2$ and $B_2$ are green colour components and $I_3$ and $B_3$ are blue colour components.

44. A method as claimed in claim 41, characterised in that the step (c) forms colour component difference images $I_i-B_i$ and performs a moving window averaging step on each of the colour component difference images.

45. A method as claimed in claim 39, characterised in that the window has a size of 3×3 pixels.

46. A method as claimed in claim 44, characterised in that the window has a size of 3×3 pixels.

47. A method as claimed in claim 1, characterised by forming a binary mask whose elements correspond to difference image pixels, each element having a first value if the corresponding difference image pixel is allocated to the at least one first type of region and a second value different from the first value if the corresponding difference image pixel is allocated to the at least one second type of region.

48. A method as claimed in claim 5, characterised by replacing the value of each pixel of the or each image corresponding to a difference image pixel allocated to the at least one background region with the value of a corresponding background image pixel.

49. A method as claimed in claim 5, characterised by replacing the value of each pixel of the or each image corresponding to a difference image pixel allocated to the at least one background region with the value of a corresponding pixel of a different background.

50. A method as claimed in claim 49, characterised by replacing the value of each pixel of the or each image corresponding to a difference image pixel allocated to a boundary of at least one foreground region with a linear combination of the value of the image pixel and the value of the corresponding different background pixel.

51. A method as claimed in claim 50, characterised in that the linear combination comprises the arithmetic mean of the or each pair of corresponding pixel component values.

52. A method as claimed in claim 5, characterised by, for each colour component, forming a distribution of the differences between the colour component values of the pixels allocated to the at least one background region and the corresponding pixels of the non-occluded background image, determining a shift in the location of a peak in the distribution from a predetermined location, and correcting the colour component values of the pixels allocated to the at least one background region in accordance with the shift.

53. An apparatus for segmenting a pixellated image, characterised by means for selecting at least one first region from a first reference image, means for deriving from values of pixels of the at least one first region a first threshold such that a first predetermined proportion of the pixels have values on a first side of the first threshold, means for forming a difference image as a difference between each pixel of the image and a corresponding pixel of an image of a non-occluded background, and means for allocating each difference image pixel to at least one first type of region if the value of the difference image pixel is on the first side of the first threshold and the values of more than a first predetermined number of neighbouring difference image pixels are on the first side of the first threshold.

54. An apparatus for segmenting a pixellated image, characterised by a programmable data processor and a storage medium containing a program for controlling the data processor to perform a method as claimed in claim 1.

55. A storage medium containing a program for controlling a data processor to perform a method as claimed in claim 1.

56. A program for controlling a data processor to perform a method as claimed in claim 1.

57. An image capture device characterised by including an apparatus as claimed in claim 53.

58. An image capture device characterised by including an apparatus as claimed in claim 54.

* * * * *